United States Patent
Wang et al.

(10) Patent No.: US 9,539,905 B2
(45) Date of Patent: Jan. 10, 2017

(54) THREE-DOF HYBRID DAMPING PANTOGRAPH

(71) Applicants: Anhui University of Science and Technology, Huainan, Anhui (CN); Xiaolong Zhu, Hefei, Anhui (CN)

(72) Inventors: Chengjun Wang, Anhui (CN); Long Li, Anhui (CN); Xiaolong Zhu, Anhui (CN); Zhiwei Liu, Anhui (CN); Chao Zhang, Anhui (CN); Kai Liu, Anhui (CN); Tianyu Zhang, Anhui (CN)

(73) Assignees: Anhui University of Science and Technology, Huainan (CN); Xiaolong Zhu, Hefei (CN)

( * ) Notice: Subject to any disclaimer, the term of this patent is extended or adjusted under 35 U.S.C. 154(b) by 0 days.

(21) Appl. No.: 14/890,156

(22) PCT Filed: May 28, 2015

(86) PCT No.: PCT/CN2015/080003
§ 371 (c)(1),
(2) Date: Nov. 9, 2015

(87) PCT Pub. No.: WO2016/026337
PCT Pub. Date: Feb. 25, 2016

(65) Prior Publication Data
US 2016/0257205 A1 Sep. 8, 2016

(30) Foreign Application Priority Data

Aug. 19, 2014 (CN) .......................... 2014 1 0409208

(51) Int. Cl.
*B60L 5/00* (2006.01)
*B60L 5/18* (2006.01)
(Continued)

(52) U.S. Cl.
CPC .. *B60L 5/18* (2013.01); *B60L 5/22* (2013.01); *B61C 3/00* (2013.01)

(58) Field of Classification Search
CPC ................. B60L 5/18; B60L 5/19; B60L 5/20; B60L 5/205; B60L 5/22; B60L 5/24; B60L 5/26; B60L 5/28; B61C 3/00
See application file for complete search history.

(56) References Cited

U.S. PATENT DOCUMENTS 2,075,138 A * 3/1937 Schaake .................... B60L 5/18
184/15.1
3,830,990 A * 8/1974 Gray ......................... B60L 5/22
191/55
(Continued)

FOREIGN PATENT DOCUMENTS

CN 202413452 U 9/2012

OTHER PUBLICATIONS

International Search Report and Written Opinion of ISA of PCT/CN2015/080003 issued on Jul. 21, 2015 (in Chinese).
(Continued)

*Primary Examiner* — Jason C Smith

(57) ABSTRACT

The invention discloses a three-DOF hybrid damping pantograph, comprising an electric driving transmission system fixed on a base, and collector heads, transverse dampers, parallel support frames as well as longitudinal dampers. Square auxiliary holes are arranged on the base, supporting insulators are arranged on four angles below the base; four transverse dampers are symmetrically fixed on the base, and arranged on the outside of the parallel support frames and connected with the parallel support frames through hinges; four longitudinal dampers are symmetrically fixed on the top of the parallel support frames; the collector heads are connected with the parallel support frames by the longitudinal dampers and separators are arranged on the collector
(Continued)

heads. The invention can realize bearing and damping spatially in three directions, avoid pantograph detachment, catenary scraping and other safety accidents, and improve the structural stability of the pantograph and adaptability to the catenary.

4 Claims, 3 Drawing Sheets

(51) Int. Cl.
*B61C 3/00* (2006.01)
*B60L 5/22* (2006.01)

(56) References Cited

U.S. PATENT DOCUMENTS

| | | | | |
|---|---|---|---|---|
| 3,908,806 A * | 9/1975 | Leger | ............... | B60L 5/22 191/59 |
| 4,113,074 A * | 9/1978 | Stemmann | ............... | B60L 5/18 191/66 |
| 4,363,940 A * | 12/1982 | Bertelsbeck | ............... | B60L 5/18 191/59.1 |
| 4,471,175 A * | 9/1984 | Gronlund | ............... | B60L 5/19 105/199.2 |
| 5,124,510 A * | 6/1992 | Garfinkle | ............... | B60L 5/19 191/59.1 |
| 6,131,520 A * | 10/2000 | Dull | ............... | B60L 5/19 105/164 |
| 6,273,001 B1 * | 8/2001 | Amigot | ............... | B60L 5/19 104/117 |
| 6,474,455 B1 * | 11/2002 | Blaschko | ............... | B60L 5/19 105/199.1 |
| 2002/0086558 A1 * | 7/2002 | Blanvillain | ............... | B60L 5/22 439/32 |
| 2010/0200041 A1 * | 8/2010 | Dearborn | ............... | B60L 5/18 136/244 |
| 2011/0259656 A1 * | 10/2011 | Lacour | ............... | B60L 3/0069 180/65.1 |
| 2013/0092492 A1 * | 4/2013 | Andre | ............... | B60L 5/42 191/47 |
| 2013/0106349 A1 * | 5/2013 | Tuyeras | ............... | B60L 5/20 320/109 |
| 2013/0256073 A1 * | 10/2013 | Yamada | ............... | B60L 5/20 191/60.2 |
| 2013/0270050 A1 * | 10/2013 | Yamada | ............... | B60L 5/20 191/59 |
| 2014/0032028 A1 * | 1/2014 | Saito | ............... | B60L 5/045 701/22 |
| 2014/0097054 A1 * | 4/2014 | Francke | ............... | B60L 5/08 191/59.1 |
| 2014/0110205 A1 * | 4/2014 | Dronnik | ............... | B60L 5/08 191/59.1 |
| 2014/0138200 A1 * | 5/2014 | Dronnik | ............... | B60L 5/08 191/59.1 |
| 2014/0202816 A1 * | 7/2014 | Kuo | ............... | B60L 5/20 191/59.1 |
| 2014/0203596 A1 * | 7/2014 | Kurita | ............... | B60L 5/18 296/211 |
| 2015/0239349 A1 * | 8/2015 | Keil | ............... | B60L 5/08 191/59.1 |
| 2015/0283906 A1 * | 10/2015 | Glinka | ............... | B60L 5/22 191/55 |
| 2015/0352959 A1 * | 12/2015 | Buehs | ............... | B60L 5/08 191/59.1 |
| 2016/0167524 A1 * | 6/2016 | Bedell | ............... | B60L 5/24 191/22 R |

OTHER PUBLICATIONS

English Translation of International Search Report and Written Opinion of ISA of PCT/CN2015/080003 issued on Jul. 21, 2015.

* cited by examiner

THREE-DOF HYBRID DAMPING PANTOGRAPH

FIELD OF THE INVENTION

The invention relates to the field of electrical equipment for running an electric rail car or locomotive, specifically a three-DOF hybrid damping pantograph capable of reducing vibration spatially in three directions.

BACKGROUND OF THE INVENTION

The pantograph is also called bow collector which is the electrical equipment installed on the electric locomotive roof for receiving electric energy from the catenary. The pantograph is one of the key parts of the electric locomotive and plays a key role in high-speed safe and stable operation of the vehicles. Smoothness between the pantograph and the catenary is highly required for high-speed train during the running process, and a little error often leads to fault. Specifically, the motor train unit will receive power from the catenary by the pantograph to drive the locomotive to go ahead during the running process. The locomotive will be deenergized and out of control, even lead to train derailment when the pantograph and the catenary are detached to each other.

The pantograph for current electric locomotive is divided into double-armed, single-armed, vertical and Ishizu types. Wherein the double-armed pantograph is called "diamond" pantograph, some new railway vehicles have been modified into the railway vehicles having single-armed pantographs at present due to high maintenance cost and risk for pulling electric train wire apart; and some railway vehicles (e.g., shinkansen 300 series vehicles) are reformed into the railway vehicles having single-armed pantographs from these having original double-armed pantographs. The advantage of "Z" (<) shaped pantograph most commonly used is that it has less noise than that from the double-armed pantograph, the electric train wire is not easy to be pulled apart in case of any fault, and such pantograph is a common pantograph at present. The vertical pantograph is also called T-shaped (alary) pantograph suitable for high-speed running due to low wind resistance and capable of reducing noise during train working process, and mainly used for high-speed railway vehicles. Due to high cost, the vertical pantograph has never been used (the vertical pantograph is changed into single-armed pantograph from vertical pantograph when shinkansen 500 series vehicles of Japan are reformed). The Ishizu pantograph was invented by Shizu Ryusuke, the sixth generation president of Okayama Electric Tramway Co., Ltd. on 1951 and also called "Okayama Electric Type" or "Okayama Tramway Type". Other pantographs are of serial-type structures except the double-armed pantograph.

Pantograph-catenary accidents in electric railway power failure and shutdown accidents account for about 80% of all accidents, the calculation of economic loss caused by pantograph-catenary accidents is fairly significant every year. Accidents including pantograph scrapping catenary or catenary scrapping pantograph caused by use of pantograph are currently serious. It shows that one suspension is dropped and the contact stripe of the catenary is knocked out for the mild case, the catenary lead and the messenger wire are dropped for the severe case when the post is dumped and the locomotive pantograph is completely damaged, resulting in catenary power failure and train running interrupted, etc. All these accidents will bring many difficulties and hazards to emergency maintenance in case of some special regional environment conditions. In recent years, innovation is made from the pantograph to the catenary to different levels so as to improve the technical performance of the equipment and reduce pantograph-catenary accidents, but the above problems have not been radically solved due to inherent defects on the structure of the pantograph.

Current collection quality of the pantograph and the contact wire of the electric locomotive mainly depends on the interaction between the pantograph and the catenary. To ensure the smooth flow of the traction current, a certain contact pressure must exist between the pantograph and the contact wire. If the contact pressure between the pantograph and the catenary is too low, the percentage of contact loss will be increased; if the contact pressure is too high, high mechanical abrasion will be produced between the sliding plate and the contact wire. The actual contact pressure between the pantograph and the catenary is composed of four parts: static contact pressure, which is a vertical force applied on the sliding plate through the pantograph ascending device to ascend the sliding plate; an up-down alternating dynamic contact pressure related to the equivalent mass and generated from the pantograph which vibrates up and down during the operation after the contact wire ascends to different levels under the rising function of the pantograph due to elastic difference in the contact suspension; an aerodynamic force, which rapidly increases with the increase of the speed and is generated from the pantograph due to the function of air flow during the operation; and damping force generated from all joints of the pantograph during the pantograph ascending and descending processes. In addition, the electric locomotive may bring large lateral force to the pantograph in case of side wind during the operation.

For the conventional pantograph which has limitation on inherent structure, the collector heads mainly move in vertical direction, preloading and buffering devices for damping are set in vertical direction only, but no damping device is provided in advancing direction and lateral direction of the vehicles. Moreover, the existing pantographs are not provided with head separation devices. The scrapers on the collector heads cannot be separated in case of pantograph-catenary scrapping, so the pantograph-catenary scrapping accident may easily occur. Some potential problems exist due to poor structural stability of the existing pantographs and little consideration of protection measures in lateral force loading and pantograph-catenary scrapping process.

SUMMARY OF THE INVENTION

The purpose of the invention is to provide a three-DOF hybrid damping pantograph capable of damping spatially in three directions for overcoming the deficiencies of the existing pantograph technology. The technical problems are to be solved in the invention by the following technical scheme.

A three-DOF hybrid damping pantograph, comprising an electric driving transmission system fixed on a base, collector heads, transverse dampers, parallel support frames and longitudinal dampers. Wherein square auxiliary holes are arranged on the base, supporting insulators connected with the car roof are arranged on four angles below the base; four transverse dampers are arranged on the outside of the parallel support frames for realizing transverse damping of the pantograph and symmetrically fixed on the base, and connected with the parallel support frames through hinges; four longitudinal dampers are symmetrically fixed on the top of the parallel support frames for realizing longitudinal damping of the pantograph; the collector heads are connected with the parallel support frames by the longitudinal dampers.

The parallel support frames are used for supporting the collector heads and realizing lifting and contacting functions of the collector heads with the electric driving transmission system. The parallel support frames are completely symmetrical structures on all sides, comprising linear guide rails, open-type linear bearing pedestals, two-staged (or three-staged) cylinders, scalable guide posts, U-shaped stands and intermediate connecting plates. The linear guide rails are fixed on the base; the open-type linear bearing pedestals are connected with the linear guide rails by the first sliding pairs, the open-type linear bearing pedestals are connected with the transverse dampers through hinges; the two-staged (or three-staged) cylinders form the second sliding pairs mainly for realizing the vertical lifting function of the parallel support frames, the lower ends are connected with the open-type linear bearing pedestals by the first revolute pairs and the upper ends are connected with the U-shaped stands by the second revolute pairs; the scalable guide posts have functions of enhancing transverse strength and guiding and limiting the collector heads during lifting, the bottom ends are fixed on the base by bolts and the top ends are connected with the U-shaped stands by the third revolute pairs, the scalable guide posts can extend or retract with the lifting of the U-shaped stands to form the third sliding pairs, the axes of the third sliding pairs formed through the scalable guide posts are vertical to the upper surface of the base and the axes of the first sliding pairs; both ends of the intermediate connecting plates are connected with the U-shaped stands by the fourth revolute pairs.

The parallel support frame is of {4PRPR-2PR}-P hybrid structure, i.e., a sliding pair P is serially connected based on the parallel mechanism {4PRPR-2PR}. The axes of the first revolute pairs, the second revolute pairs and the third revolute pairs on the parallel support frames are in parallel to each other. The axes of the first revolute pairs are vertical to the axes of the second sliding pairs and the axes of the fourth revolute pairs, the axes of the first sliding pairs are vertical to the axes of the first revolute pairs, and the axes of the first sliding pairs are in parallel to the axes of the fourth revolute pairs.

The electric driving transmission system is used for driving the open-type linear bearing pedestals on bottoms of the parallel support frames to transversely slide so as to realize the lifting of the collector heads. The electric driving transmission system comprises a left rotating screw rod, a right rotating screw rod, and motors, retarders and bearing pedestals. The retarders are dual-output-shaft worm gear retarders; the motors are installed at the input ends of the retarders; one end of the left rotating screw rod and one end of the right rotating screw rod are connected with two output shafts of the retarders respectively, and the other ends are installed on the base by the bearing pedestals.

The transverse dampers comprise cross-moving slide bases, preloaded springs and cross-moving dampers, the cross-moving slide bases are installed on the linear guide rails of the parallel support frames and connected with the linear guide rails by the sliding pairs; the preloaded springs are located between the cross-moving slide bases and the open-type linear bearing pedestals, and the preloaded springs are sleeved on the cross-moving dampers; one end of the cross-moving dampers is connected with the open-type linear bearing pedestals of the parallel support frames by hinges and the other end is connected with the cross-moving slide bases by hinges.

The longitudinal dampers are composed of lugs, guide rods and springs, the lugs are located on the upper surfaces of the intermediate connecting plates and firmly connected with the intermediate connecting plates, the springs are sleeved on the guide rods and both ends of the guide rods are installed in the lugs.

The collector heads are composed of head brackets, separators, sliding plate bolts and carbon sliding plates. Both ends of the bottoms of the head brackets are provided with two longitudinal sliding sleeves having parallel axes respectively, the top parts of the head brackets are provided with dismounting holes; the sliding plate bolts are connected with the head brackets by the separators; the carbon sliding plates are located on the top ends of the sliding plate bolts and firmly connected with the sliding plate bolts.

The separators comprise elastic jack catches and trough bodies, the elastic jack catches are located on the lower ends of the sliding plate bolts and firmly connected with the sliding plate bolts, at least three elastic jack catches are provided, the external sides of the bottoms of the elastic jack catches are provided with antiskid bulges; the trough bodies are located on top parts of the head brackets and firmly integrated with the head brackets, and troughs are provided in the trough bodies; the elastic jack catches are installed in the troughs of the trough bodies.

The invention is arranged on the top of the electric rail car or locomotive, the working process is that: after the vehicles draw up at the station, four two-staged (or three-staged) cylinders on the parallel support frames extend to drive the U-shaped stands, the intermediate connecting plates and the collector heads on the intermediate connecting plates to ascend, but the two-staged (or three-staged) cylinders stop extending when the carbon sliding plates of the collector heads approach to the grid height. Then, the motors and the retarders of the electric driving transmission system drives the left rotating screw rod and the right rotating screw rod to rotate, thereby driving the open-type linear bearing pedestals on the transverse dampers and the parallel support frames to transversely slide inwards so as to achieve secondary ascent of the collector heads. When the carbon sliding plates of the collector heads contact the power grid and reach the set preload, the motors stop rotating, and the carbon sliding plates effectively contact the power grid and get charged simultaneously. After being charged, the motors are reversely rotated to drive the transverse dampers and the open-type linear bearing pedestals to transversely slide outwards so as to descend the collector heads and effectively separate the carbon sliding plates from the power grid. And then, four two-staged (or three-staged) cylinders on the parallel support frames retract, the height of the collector heads is reduced and the operation is completed once through the pantograph.

The advantages of the invention are as follows: compared with the prior art, the connecting rod lifting mechanism in series of the conventional pantograph is replaced with the parallel support frames of {4PRPR-2PR}-P hybrid structure of the invention, the collector heads have three degrees of freedom of motion horizontally moving in the space, which can realize lifting, bearing and damping functions of the collector heads in vertical direction, and bear lateral force and effectively damp in two directions of the plane; setting of the separators can also avoid pantograph detachment, catenary scraping and other safety accidents, and improve the structural stability of the pantograph and adaptability to the catenary resulting in such advantages as stable and reliable work, convenient operation and maintenance, etc.

DETAILED DESCRIPTION OF ILLUSTRATED EMBODIMENTS

To easily understand the technical means, creative features, purposes and achievements, the invention will be further described in combination with the following embodiments and diagrams.

Figure 1:
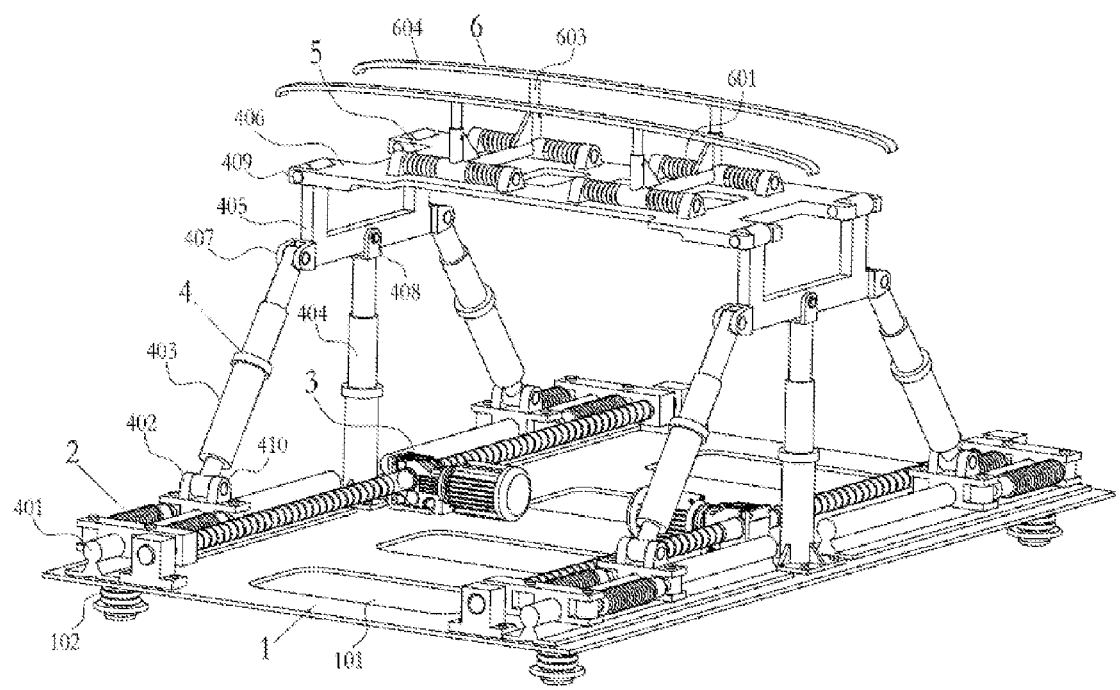
FIG. 1 is an overall structural diagram of the invention.
Figure 3:
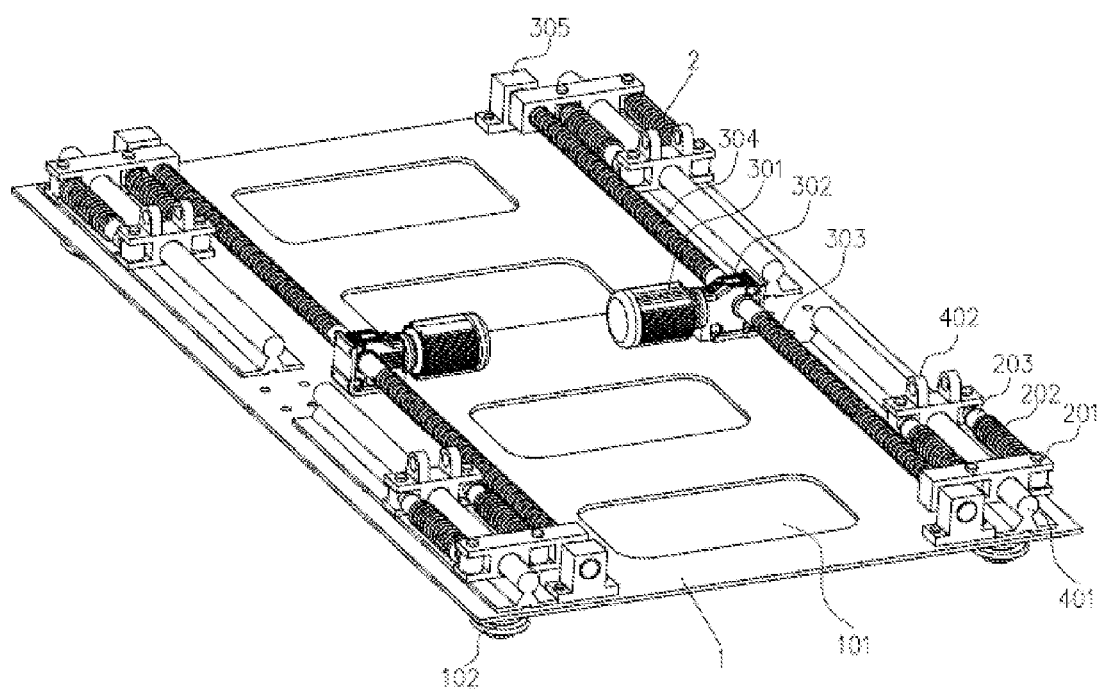
FIG. 3 is a structural diagram of the electric driving transmission system and the transverse dampers of the invention.

As shown in FIG. 1 and FIG. 3, a three-DOF hybrid damping pantograph comprises a base 1, transverse dampers 2, electric driving transmission system 3, parallel support frames 4, longitudinal dampers 5 and collector heads 6. Wherein square auxiliary holes 101 are arranged on the base 1, supporting insulators 102 connected with the car roof are arranged on four angles below the base 1; four transverse dampers 2 are arranged on the outside of the parallel support frames 4 for realizing transverse damping of the pantograph and symmetrically fixed on the base 1, and transverse dampers 2 and connected with the parallel support frames 4 through hinges; four longitudinal dampers 5 are symmetrically fixed on the top of the parallel support frames 4 for realizing longitudinal damping of the pantograph; the collector heads 6 are connected with the parallel support frames 4 by the longitudinal dampers 5.

Figure 2:
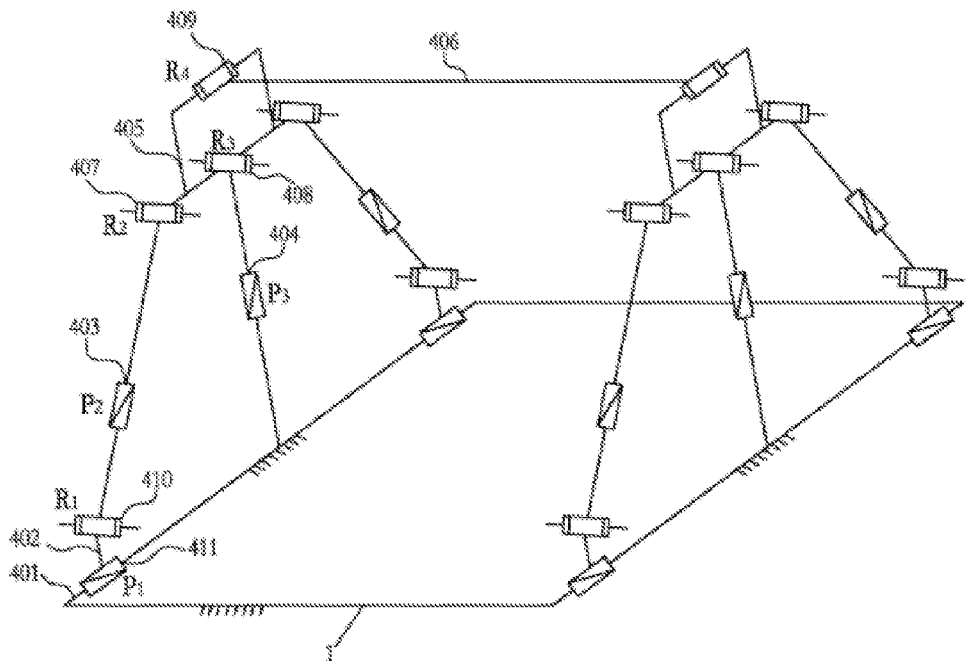
FIG. 2 is a schematic diagram of the mechanism principle for the parallel support frames of the invention.

As shown in FIG. 1, FIG. 2 and FIG. 3, the parallel support frames 4 are used for supporting the collector heads 6 and realizing lifting and contacting functions of the collector heads 6 with the electric driving transmission system 3. The parallel support frames 4 are completely symmetrical structures on all sides, comprising linear guide rails 401, open-type linear bearing pedestals 402, two-staged (or three-staged) cylinders 403, scalable guide posts 404, U-shaped stands 405 and intermediate connecting plates 406. The linear guide rails 401 are fixed on the base 1; the open-type linear bearing pedestals 402 are connected with the linear guide rails 401 by the first sliding pairs (P1) 411, the open-type linear bearing pedestals 402 are connected with the transverse dampers 2 through hinges; the two-staged (or three-staged) cylinders 403 form the second sliding pairs P2 mainly for realizing the vertical lifting function of the parallel support frames 4, the lower ends are connected with the open-type linear bearing pedestals 402 by the first revolute pairs (R1) 410 and the upper ends are connected with the U-shaped stands 405 by the second revolute pairs (R2) 407; the scalable guide posts 404 have functions of enhancing transverse strength and guiding and limiting the collector heads 6 during lifting, the bottom ends are fixed on the base 1 by bolts and the top ends are connected with the U-shaped stands 405 by the third revolute pairs (R3) 408, the scalable guide posts 404 can extend or retract with the lifting of the U-shaped stands 405 to form the third sliding pairs P3, the axes of the third sliding pairs formed through the scalable guide posts 404 are vertical to the upper surface of the base 1 and the axes of the first sliding pairs (P1) 411; both ends of the intermediate connecting plates 406 are connected with the U-shaped stands 405 by the fourth revolute pairs (R4) 409.

As shown in FIG. 2, the parallel support frames 4 are of {4PRPR-2PR}-P hybrid structure, i.e., a sliding pair P is serially connected based on the parallel mechanism {4PRPR-2PR}. The axes of the first revolute pairs (R1) 410, the second revolute pairs (R2) 407 and the third revolute pairs (R3) 408 on the parallel support frames 4 are in parallel to each other. The axes of the first revolute pairs (R1) 410 are vertical to the axes of the second sliding pairs (P2) 403 and the axes of the fourth revolute pairs (R4) 409, the axes of the first sliding pairs (P1) 411 are vertical to the axes of the first revolute pairs (R1) 410, and the axes of the first sliding pairs (P1) 411 are in parallel to the axes of the fourth revolute pairs (R4) 409. The fourth revolute pairs (R4) 409 are inactive kinematic pairs which are set for convenient installation and assembling of the parallel support frames 4 and cannot affect the freedom of motion of the parallel support frames 4.

As shown in FIG. 1 and FIG. 3, the electric driving transmission system 3 is used for driving the open-type linear bearing pedestals 402 on bottoms of the parallel support frames 4 to transversely slide so as to realize the lifting of the collector heads 6. The electric driving transmission system 3 comprises motors 301, retarders 302, a left rotating screw rod 303, a right rotating screw rod 304, and bearing pedestals 305. The retarders 302 are dual-output-shaft worm gear retarders; the motors 301 are installed at the input ends of the retarders 302; one end of the left rotating screw rod 303 and one end of the right rotating screw rod 304 are connected with two output shafts of the retarders 302 respectively, and the other ends are installed on the base 1 by the bearing pedestals 305;

As shown in FIG. 1 and FIG. 3, the transverse dampers 2 comprise cross-moving slide bases 201, preloaded springs 202 and cross-moving dampers 203, the cross-moving slide bases 201 are installed on the linear guide rails 401 of the parallel support frames 4 and connected with the linear guide rails 401 by the sliding pairs; the preloaded springs 202 are located between the cross-moving slide bases 201 and the open-type linear bearing pedestals 402, and the preloaded springs 202 are sleeved on the cross-moving dampers 203; one end of the cross-moving dampers 203 is connected with the open-type linear bearing pedestals 402 of the parallel support frames 4 by hinges and the other end is connected with the cross-moving slide bases 201 by hinges.

Figure 4:
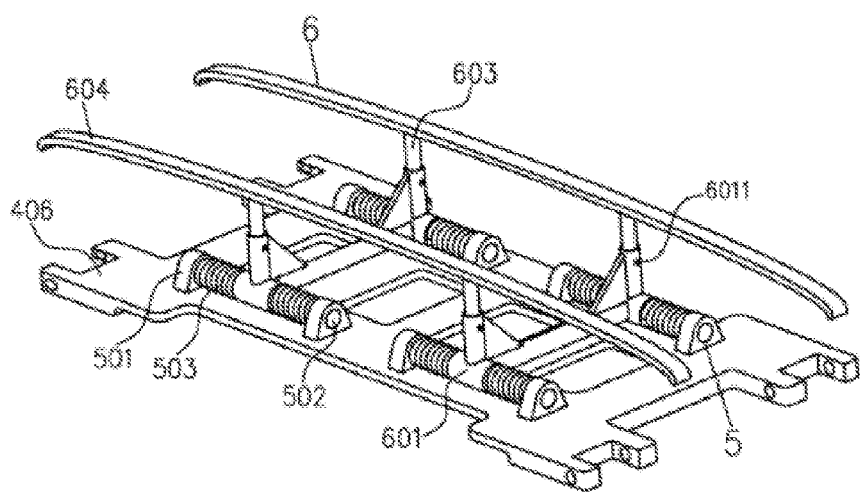
FIG. 4 is a structural diagram of the collector heads and the longitudinal dampers of the invention.

As shown in FIG. 1 and FIG. 4, the longitudinal dampers 5 are composed of lugs 501, guide rods 502 and springs 503. The lugs 501 are located on the upper surfaces of the intermediate connecting plates 406 and firmly connected with the intermediate connecting plates 406, the springs 503 are sleeved on the guide rods 502 and both ends of the guide rods 502 are installed in the lugs 501.

Figure 5:
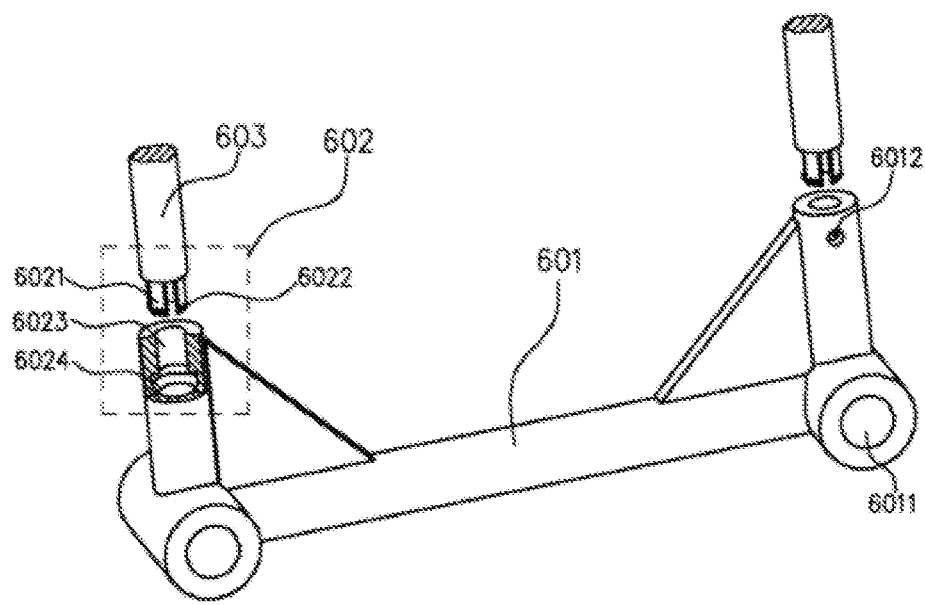
FIG. 5 is a structural diagram of the separators of the invention.

As shown in FIG. 1, FIG. 4 and FIG. 5, the collector heads 6 are composed of head brackets 601, separators 602, sliding plate bolts 603 and carbon sliding plates 604. Both ends of the bottoms of the head brackets 601 are provided with two longitudinal sliding sleeves 6011 respectively, the top parts of the head brackets 601 are provided with dismounting holes 6012; the sliding plate bolts 603 are connected with the head brackets 601 by the separators 602; the carbon sliding plates 604 are located on the top ends of the sliding plate bolts 603 and firmly connected with the sliding plate bolts 603.

As shown in FIG. 5, the separators 602 comprise elastic jack catches 6021 and trough bodies 6023, the elastic jack catches 6021 are located under the sliding plate bolts 603 and firmly connected with the sliding plate bolts 603, at least three elastic jack catches 6021 are provided, the external sides of the bottoms of the elastic jack catches 6021 are provided with antiskid bulges 6022; the trough bodies 6023 are located on top parts of the head brackets 601 and firmly integrated with the head brackets 601, and troughs 6024 are provided in the trough bodies 6023; the elastic jack catches 6021 are installed in the troughs 6024 of the trough bodies 6023.

The invention is placed on the top of the electric rail car or the locomotive in use. After the vehicles draw up at the station, four two-staged (or three-staged) cylinders 403 on the parallel support frames 4 extend to drive the U-shaped stands 405, the intermediate connecting plates 406 and the collector heads 6 on the intermediate connecting plates 406 to ascend, but the two-staged (or three-staged) cylinders 403 stop extending when the carbon sliding plates 604 of the collector heads 6 approach to the grid height. Then, the motors 301 and the retarders 302 of the electric driving transmission system 3 drives the left rotating screw rod 303 and the right rotating screw rod 304 to rotate, thereby driving the open-type linear bearing pedestals 402 on the transverse dampers 2 and the parallel support frames 4 to transversely slide inwards so as to achieve secondary ascent of the collector heads 6. When the carbon sliding plates 604 of the collector heads 6 contact the power grid and reach the set preload, the motors 301 stop rotating, and the carbon sliding plates 604 effectively contact the power grid and get charged simultaneously. After being charged, the motors 301 are reversely rotated to drive the transverse dampers 2 and the open-type linear bearing pedestals 402 to transversely slide outwards so as to descend the collector heads 6 and effectively separate the carbon sliding plates 604 from the power grid. And then four two-staged (or three-staged) cylinders 403 on the parallel support frames 4 retract, the height of the collector heads 6 is reduced and the operation is completed once through the pantograph.

The above contents show and describe the fundamental principles, main features and advantages of the invention. It should be understood by a person skilled in the art that the invention is not limited to the above Embodiments, the Embodiments and the Description only describe the principle of the invention, and various changes and improvements can be made to the invention without departing from spirit and scope of the invention, and the changes and improvements will fall into the protection scope of the invention. The scope the invention requests to protect is to be restricted by the appended claims and the equivalent.

What is claimed is:

1. A three degrees of freedom (DOF) hybrid damping pantograph, comprising
an electric driving transmission system fixed on a base; and
collector heads; and further comprising
a plurality of transverse dampers;
parallel support frames;
a plurality of longitudinal dampers;
square auxiliary holes being arranged on the base; and
supporting insulators being arranged below four corners of the base;
wherein the plurality of transverse dampers comprises four transverse dampers which are symmetrically fixed on the base, and arranged on and outside of the parallel support frames and connected with the parallel support frames through hinges;
wherein the plurality of longitudinal dampers comprises four longitudinal dampers which are symmetrically fixed on top of the parallel support frames; the collector heads being connected with the parallel support frames by the four longitudinal dampers;
the parallel support frames comprising four linear guide rails, four open-type linear bearing pedestals, four two-staged or three-staged cylinders, two scalable guide posts, two U-shaped stands and an intermediate connecting plate; the linear guide rails being fixed on top of the base; the four open-type linear bearing pedestals being connected with the four linear guide rails by four first sliding pairs respectively, the four open-type linear bearing pedestals being connected with the four transverse dampers respectively through the hinges; lower ends of the four two-staged or three-staged cylinders being connected with the four open-type linear bearing pedestals by four first revolute pairs and upper ends of the four two-staged or three-staged cylinders being connected with the two U-shaped stands by four second revolute pairs respectively; bottom ends of the two scalable guide posts being fixed on the base by bolts and top ends of the two scalable guide posts being connected with the two U-shaped stands by two third revolute pairs respectively, axes of the two scalable guide posts being perpendicular to an upper surface of the base and axes of the first sliding pairs; both ends of the intermediate connecting plate being connected with the two U-shaped stands by two fourth revolute pairs respectively;
the electric driving transmission system comprising two left rotating screw rod, two right rotating screw rod, two motors, two retarders and four bearing pedestals; the retarders being dual-output-shaft worm gear retarders; the two motors being installed at input ends of the two retarders respectively; one end of each left rotating screw rod and one end of each right rotating screw rod being connected with two output shafts of each retarder respectively, and the other ends of the left and right rotating screw rods being installed on the base by the bearing pedestals;
each longitudinal damper comprising a pair of lugs, a guide rod and a spring, the lugs being located on an upper surface of the intermediate connecting plate and firmly connected with the intermediate connecting plate, the spring being sleeved on the guide rod and both ends of the guide rod being installed in the pair of lugs respectively.

2. The three-DOF hybrid damping pantograph according to claim 1, wherein each of the four transverse dampers comprises a cross-moving slide base, a preloaded spring and a cross-moving damper, wherein the four cross-moving slide bases are installed on the four linear guide rails of the parallel support frames and connected with the four linear guide rails by the four first sliding pairs respectively; the preloaded springs being located between the cross-moving slide bases and the open-type linear bearing pedestals, and the preloaded springs being sleeved on the cross-moving dampers; wherein one end of each cross-moving damper is connected with its associated open-type linear bearing pedestal of the parallel support frames by a first hinge and the other end of each cross-moving damper is connected with its associated cross-moving slide base by a second hinge.

3. The three-DOF hybrid damping pantograph according to claim 1, wherein the collector heads comprise two head brackets, four separators, four sliding plate bolts and two carbon sliding plates, wherein bottom of both ends of each head bracket are provided with two longitudinal sliding sleeves having two parallel axes respectively, two top parts of each head bracket being provided with two dismounting holes respectively; the sliding plate bolts being connected with the head brackets by the separators; each carbon sliding plate being located on top ends of two of the four sliding plate bolts and firmly connected with the sliding plate bolts;

wherein each separator comprises a plurality of elastic jack catches and a trough body, the elastic jack catches being located under the sliding plate bolt and firmly connected with the sliding plate bolt, the plurality of elastic jack catches comprising at least three elastic jack catches, an external side at a bottom of each elastic jack catch being provided with an antiskid bulge; wherein the trough body is located on each of the two top parts of the head brackets and firmly integrated with the head brackets, and a trough is provided in each trough body; and the elastic jack catches are installed in the trough of each trough body.

4. The three-DOF hybrid damping pantograph according to claim 1, wherein axes of the first revolute pairs, the second revolute pairs and the third revolute pairs on the parallel support frames are parallel to each other, the axes of the first revolute pairs are perpendicular to axes of the two-staged or three-staged cylinders and axes of the fourth revolute pairs, axes of the first sliding pairs are perpendicular to the axes of the first revolute pairs, and the axes of the first sliding pairs are parallel to the axes of the fourth revolute pairs.

* * * * *